(12) United States Patent
Bidhar

(10) Patent No.: US 12,480,228 B2
(45) Date of Patent: Nov. 25, 2025

(54) METHODS AND SYSTEMS FOR ELECTROSPINNING USING LOW POWER VOLTAGE CONVERTER

(71) Applicant: Fermi Research Alliance, LLC, Batavia, IL (US)

(72) Inventor: Sujit Bidhar, Carol Stream, IL (US)

(73) Assignee: FERMI FORWARD DISCOVERY GROUP, LLC, Chicago, IL (US)

(*) Notice: Subject to any disclaimer, the term of this patent is extended or adjusted under 35 U.S.C. 154(b) by 160 days.

(21) Appl. No.: 18/370,777

(22) Filed: Sep. 20, 2023

(65) Prior Publication Data

US 2024/0011195 A1  Jan. 11, 2024

Related U.S. Application Data

(63) Continuation-in-part of application No. 17/502,611, filed on Oct. 15, 2021, now Pat. No. 11,788,207.
(Continued)

(51) Int. Cl.
| | |
|---|---|
| *B29C 41/28* | (2006.01) |
| *B29C 48/355* | (2019.01) |
| *D01D 5/00* | (2006.01) |
| *D01F 1/09* | (2006.01) |
| *D01F 6/94* | (2006.01) |
| *D01D 10/00* | (2006.01) |

(52) U.S. Cl.
CPC ......... *D01D 5/0084* (2013.01); *D01D 5/0038* (2013.01); *D01D 5/0061* (2013.01); *D01D 5/0069* (2013.01); *D01D 5/0076* (2013.01); *D01D 5/0092* (2013.01); *D01F 1/09* (2013.01); *D01F 6/94* (2013.01); *D01D 10/00* (2013.01)

(58) Field of Classification Search
CPC .... B29C 41/28; B29C 48/355; D01D 5/0061; D01D 5/0069; D01D 5/0076
USPC .................. 425/174.8 E, 224, 377, 447, 470
See application file for complete search history.

(56) References Cited

U.S. PATENT DOCUMENTS

| | | |
|---|---|---|
| 5,295,039 A | 3/1994 | Nakajima et al. |
| 6,753,454 B1 | 6/2004 | Smith et al. |
| (Continued) | | |

FOREIGN PATENT DOCUMENTS

| | | | | |
|---|---|---|---|---|
| CN | 102828260 A | | 12/2012 | |
| CN | 104451910 A | * | 3/2015 | ........... D01D 5/0092 |
| (Continued) | | | | |

OTHER PUBLICATIONS

Translation of CN 104451910 A (published on Mar. 25, 2015).*
(Continued)

*Primary Examiner* — Leo B Tentoni
(74) *Attorney, Agent, or Firm* — LOZA & LOZA, LLP; Kevin L. Soules

(57) ABSTRACT

An electrospinning system, method, and apparatus comprises a dual polarity high voltage power supply with much less power out for safe operation, a solution dispensing assembly held at high positive potential by the dual polarity power supply, a Corona discharge assembly held at high negative potential by the dual polarity power supply, and a drum collector held at ground potential wherein a solution is drawn from the solution dispensing assembly to the drum collector thereby forming a fiber mat.

18 Claims, 16 Drawing Sheets

Related U.S. Application Data which is a continuation of application No. 16/266,569, filed on Feb. 4, 2019, now Pat. No. 11,174,570.

(60) Provisional application No. 62/626,215, filed on Feb. 5, 2018.

(56) References Cited

U.S. PATENT DOCUMENTS

| | | |
|---|---|---|
| 7,264,762 B2 | 9/2007 | Ko et al. |
| 8,518,320 B2 | 8/2013 | Steckl et al. |
| 2002/0084178 A1 | 7/2002 | Dubson et al. |
| 2006/0226580 A1 | 10/2006 | Xia et al. |
| 2006/0228435 A1 | 10/2006 | Andrady et al. |
| 2006/0264140 A1 | 11/2006 | Andrady et al. |
| 2006/0290031 A1 | 12/2006 | Jirsak et al. |
| 2009/0127748 A1 | 5/2009 | Takahashi |
| 2010/0028553 A1* | 2/2010 | Maly .................. D01D 5/0076 118/621 |
| 2010/0194000 A1* | 8/2010 | Petras .................. D01D 5/0069 264/484 |
| 2010/0233115 A1 | 9/2010 | Patel et al. |
| 2014/0079759 A1 | 3/2014 | Patel et al. |
| 2014/0353882 A1 | 12/2014 | Joo et al. |
| 2016/0047062 A1 | 2/2016 | Greenawalt |
| 2016/0047063 A1 | 2/2016 | Khandaker et al. |

FOREIGN PATENT DOCUMENTS

| | | |
|---|---|---|
| CN | 105970310 A | 9/2016 |
| JP | 201581391 A | 4/2015 |

OTHER PUBLICATIONS

Shi-Cong Xu et al., "A battery-operated portable handheld electrospinning apparatus", Nanoscale, 2015, 7, 12351.

Pierre-Alexis Mouthuy et al., "Performances of a portable electrospinning apparatus", Biotechnol Lett (2015) 37:1107-1116.

* cited by examiner

METHODS AND SYSTEMS FOR ELECTROSPINNING USING LOW POWER VOLTAGE CONVERTER

CROSS REFERENCE TO RELATED PATENT APPLICATIONS

The present application is a continuation in part of U.S. Pat. No. 11,788,207 (U.S. patent application Ser. No. 17/502,611) titled "METHODS AND SYSTEMS FOR ELECTROSPINNING USING LOW POWER VOLTAGE CONVERTER" filed Oct. 15, 2021. U.S. patent application Ser. No. 17/502,611 is a continuation of U.S. Pat. No. 11,174,570 (U.S. patent application Ser. No. 16/266,569) titled "METHODS AND SYSTEMS FOR ELECTROSPINNING USING LOW POWER VOLTAGE CONVERTER" filed Feb. 4, 2019. U.S. patent application Ser. No. 17/502,611 and U.S. patent application Ser. No. 16/266,569 are herein incorporated by reference in their entirety.

U.S. patent application Ser. Nos. 17/502,611, 16/266,569, and the present application claim the priority and benefit under 35 U.S.C. § 119(e) of U.S. Provisional Patent Application Ser. No. 62/626,215, filed Feb. 5, 2018, entitled "METHODS AND SYSTEMS FOR ELECTROSPINNING USING LOW POWER VOLTAGE CONVERTER." U.S. Provisional Patent Application Ser. No. 62/626,215 is herein incorporated by reference in its entirety.

STATEMENT OF GOVERNMENT RIGHTS

The invention described in this patent application was made with Government support under the Fermi Research Alliance, LLC, Contract Number DE-AC02-07CH11359 awarded by the U.S. Department of Energy. The Government has certain rights in the invention.

TECHNICAL FIELD

Embodiments are generally related to electrospinning. Embodiments are further related to methods and systems for manufacturing nanofiber. Embodiments are additionally related to methods and systems for producing a variety of ceramic nanofibers using very low power output and low voltage DC input using DC to DC voltage converters with dual polarity and a high voltage DC supply.

BACKGROUND

Electrospinning is a method used to produce polymeric nanofiber. Electrospinning methods typically require application of high voltage to a drop of liquid, causing the liquid to become charged. The charged liquid droplet is then stretched toward a collector. The elongated droplet dries as it travels to the collector. The drying fiber is subject to a whipping process that increases the path of travel, resulting in the formation of very thin fibers.

Conventional electrospinning requires sophisticated and expensive power supply units which are bulky, operate at high input voltage, and have high power output (e.g., running into the hundreds of watts). Such systems pose electrical hazards. In cases where it is desirable to have both positive and negative high voltage output, two such power supplies are required, effectively doubling the problems associated with the system complexity, bulkiness, and safety.

Accordingly, there is a need in the art for improved methods, systems, and apparatuses for electrospinning as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for electrospinning.

It is another aspect of the disclosed embodiments to provide a method and system for producing a variety of nanofibers.

It is another aspect of the disclosed embodiments to provide methods, systems, and apparatuses for producing a variety of ceramic nanofibers using very low power output and low voltage DC input using DC to DC voltage converters with dual polarity and a high voltage DC supply.

The aforementioned aspects and other objectives and advantages can now be achieved as described herein. The embodiments disclosed herein comprise an electrospinning system, method, and apparatus with a dual polarity power supply, a solution dispensing assembly held at high positive potential by the dual polarity power supply, a Corona discharge assembly held at high negative potential by the dual polarity power supply, and a drum collector held at ground potential wherein a solution is drawn from the solution dispensing assembly to the drum collector thereby forming a fiber mat.

In an embodiment, the solution dispensing assembly comprises at least one dispensing needle, a manifold attached to a syringe, the manifold connecting the syringe to the at least one dispensing needle, and a syringe pump for pumping the solution from the syringe through the manifold to the dispensing needle. In another embodiment, the solution dispensing assembly comprises a solution tank holding the solution, a rotating spindle, at least one solid needle on the rotating spindle, and a motor for rotating the spindle.

In an embodiment, the corona discharge assembly comprises a plate with a knife edge connected to the dual polarity power supply. In another embodiment, the corona discharge assembly comprises an array of micro-tipped needles connected to the dual polarity power supply.

In another embodiment an electrospinning system or apparatus comprises a power supply, a solution dispensing assembly held at positive potential by the power supply, a Corona discharge assembly held at negative potential by the power supply, and a collector wherein a solution is drawn from the solution dispensing assembly to the collector forming a fiber mat thereon. The power supply can comprise a dual polarity power supply.

In an embodiment, the solution dispensing assembly comprises at least one dispensing needle, a manifold attached to a syringe, the manifold connecting the syringe to the at least one dispensing needle, and a syringe pump for pumping the solution to the dispensing needle. In an embodiment the solution dispensing assembly comprises a solution tank containing the solution, a rotating spindle, at least one solid needle on the rotating spindle, and a motor for rotating the spindle.

In an embodiment, the Corona discharge assembly comprises a plate with a knife edge. In an embodiment the Corona discharge assembly comprises an array of at least one micro-tipped needles.

In an embodiment, the collector comprises a drum collector. A ground can be connected to the drum collector. In another embodiment the collector comprises a conveyor belt assembly. In an embodiment the conveyor belt assembly further comprises a ground plate, the ground plate being held at ground potential, and a conveyor belt wrapping around the ground plate.

Various additional embodiments and descriptions are provided herein.

BRIEF DESCRIPTION OF THE DRAWINGS

The accompanying figures, in which like reference numerals refer to identical or functionally similar elements throughout the separate views and which are incorporated in and form a part of the specification, further illustrate the embodiments and, together with the detailed description, serve to explain the embodiments disclosed herein.

DETAILED DESCRIPTION

Figure 1:
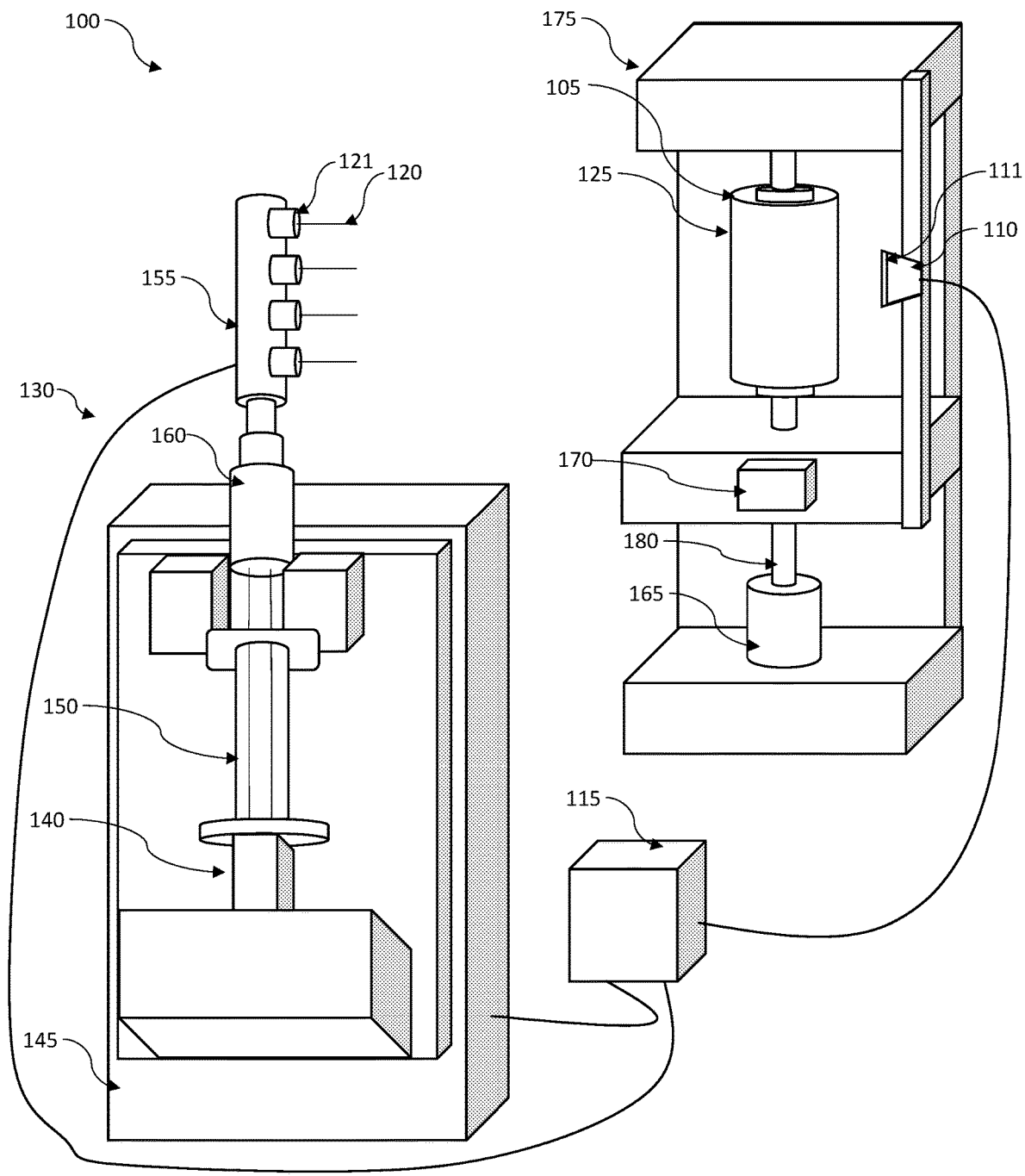
FIG. 1 depicts a block diagram of an electrospinning system, in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter, with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

The embodiments disclosed herein are drawn to methods, systems, and apparatuses for electrospinning. Electrospinning can be understood as a process for producing polymeric fiber. In some embodiments, this can include producing nanofiber mats. Generally, electrospinning operates by applying a high voltage to a specially prepared liquid that is formed into droplets at a dispensing point, such as a needle. The body of the drop is charged by the high voltage. Electrostatic repulsion creates a stream of liquid, that is ejected from the dispensing point, commonly referred to as a "Taylor Cone." The liquid stream dries as it travels toward a grounded collector. The drying liquid stream can be elongated by a whipping process. The dried and whipped fiber collects on the collector in a mat of generally, thin, and uniform fiber.

The embodiments disclosed herein describe compact nanofiber (i.e., electrospinning) production systems with the ability to produce a variety of ceramic nanofibers or polymeric materials. The nanofiber production systems can have very low power output and low voltage DC input. This is made possible by using a DC to DC voltage converter with a dual polarity high voltage DC supply, as disclosed herein.

FIG. 1 illustrates an embodiment of an electrospinning system 100 employing a dual polarity source 115, for mass production of a nanofiber mat comprising Zirconia, or other such ceramic material (e.g., alumina, Tungsten oxide, Titania, etc.), using one or more dispensing needles in a needle array 120.

The system 100 takes advantage of Corona discharge. Corona discharge creates oppositely charged ions to neutralize charge accumulation on the nanofiber mat thereby enabling the creation of a thick nanofiber mat.

In FIG. 1, a rotating collector 105 (e.g., a drum collector) is held at ground potential via ground 170. A Corona discharge assembly 175 can include a plate 110, having a knife edge 111, connected to a DC voltage source 115 that drives the Corona discharge. Nanofibers are ejected from one or more needles in the needle array 120 as shown. It should be appreciated that in FIG. 1, four needles in needle array 120 are shown but in other embodiments the number of needles can vary according to the scale of the system 100 and size of the desired nanofiber mat 125. For example, the number of needles can be adjusted to accommodate production of a larger/smaller or wider/narrower nanofiber mat. Arrangement of the needles in needle array 120 need not be linear. For example, in other embodiments, the needles in needle array 120 can be staggered or otherwise configured in any number of ways along needle manifold 155.

The system 100 can include a dual polarity power supply 115 connected to a solution dispensing assembly 130. The solution dispensing system 130 includes an actuator 140 that is connected to a syringe pump 145. The actuator 140 is fixed to a plunger 150 that is connected to a needle manifold 155. The syringe pump 145 controls the actuator 140, which pushes liquid 160 to the needle array 120 through the needle manifold 155.

The liquid 160 can comprise positively charged ions of a desired material. In certain embodiments the liquid 160 can include possible precursor solutions including Alumina→Aluminum 2,4-pentadionate+Aceton, Zirconia→Zirconium Carbonate+Acetic Acid, $WO_3$→Ammonium metatungstate+D.I. Water, and $TiO_2$→Titanium Isopropoxide. These solutions can be added with polymeric solution containing approximately 5-8 wt % of polyvinylpyrrolidone in Acetone or Ethanol.

The needle manifold 155 can be configured to include one or more needle ports 121 that connect the one or more needles in the needle array 120 to the needle manifold 155. In certain embodiments, the needle array 120, illustrated in FIG. 1, can comprise blunt needles with an internal diameter on the order of a few hundred microns.

In the embodiment illustrated in FIG. 1, the needle manifold 155 can comprise a manifold and has been designed to hold the needle array 120 at high +Ve potential. The needle manifold 155 can be 3-D printed, or can be manufactured according to other known techniques. The knife edge 111 on plate 110 is similarly maintained at a high −Ve potential to generate −Ve ions. In combination, this assembly increases the production rate of the electrospinning system 100.

A certain distance, for example, 1-5 centimeters can be maintained between the needles 120 to avoid squeezing the nanofiber cone volume that emanates from the needles 120 during use. Nanofiber constituted liquid emerging from each needle in the needle array 120 travels to the ground plate 110 in a spiral action which results in a cone like formation. Since each of the nanofibers emanating from the needle array 120 are of the same charge, they increasingly repel each other according to their relative proximity, thereby squeezing the cone of travel. Eventually this squeezing action can become sufficiently prevalent that it will lead to non-uniform deposition of nanofibers on the drum collector. Thus, in the embodiments disclosed herein, an exemplary distance between needles in the needle array 120 should be maintained to prevent this effect. In certain embodiments this distance can be at least 1 inch. This distance is sufficient to avoid squeezing of the spinning area from individual needles, due to charge repulsion, while allowing for some overlap to produce uniformity in the axial direction of the rotating collector 105.

Appropriate distance and voltage can also be maintained between the rotating collector 105 and the knife edge 111 to prevent the breakdown of air which could result in a spark instead of ionization. Although the rotating collector 105 and knife edge 111 are illustrated in FIG. 1, in other embodiments, a set of micro-tipped (e.g., approximately 10 micron tip diameter) tungsten/metallic needles can also be used to produce corona discharge, as further detailed in the embodiments presented herein.

Thus, in the embodiment illustrated in FIG. 1, the power supply 115 provides a positive DC voltage to the needle array 120 and a negative DC voltage to the knife edge 111 positioned near the rotating drum collector 105, which is kept at ground potential. The potential difference between the needle array 120 and the drum/knife edge 111 provides the attractive force that results in the thin liquid jet depositing material 125 on the rotating drum 105. The drum 105 is rotated with a motor 165 connected to a drive shaft 180, so that a mat of surrounding fiber 125 is deposited on the drum 105.

Figure 2:
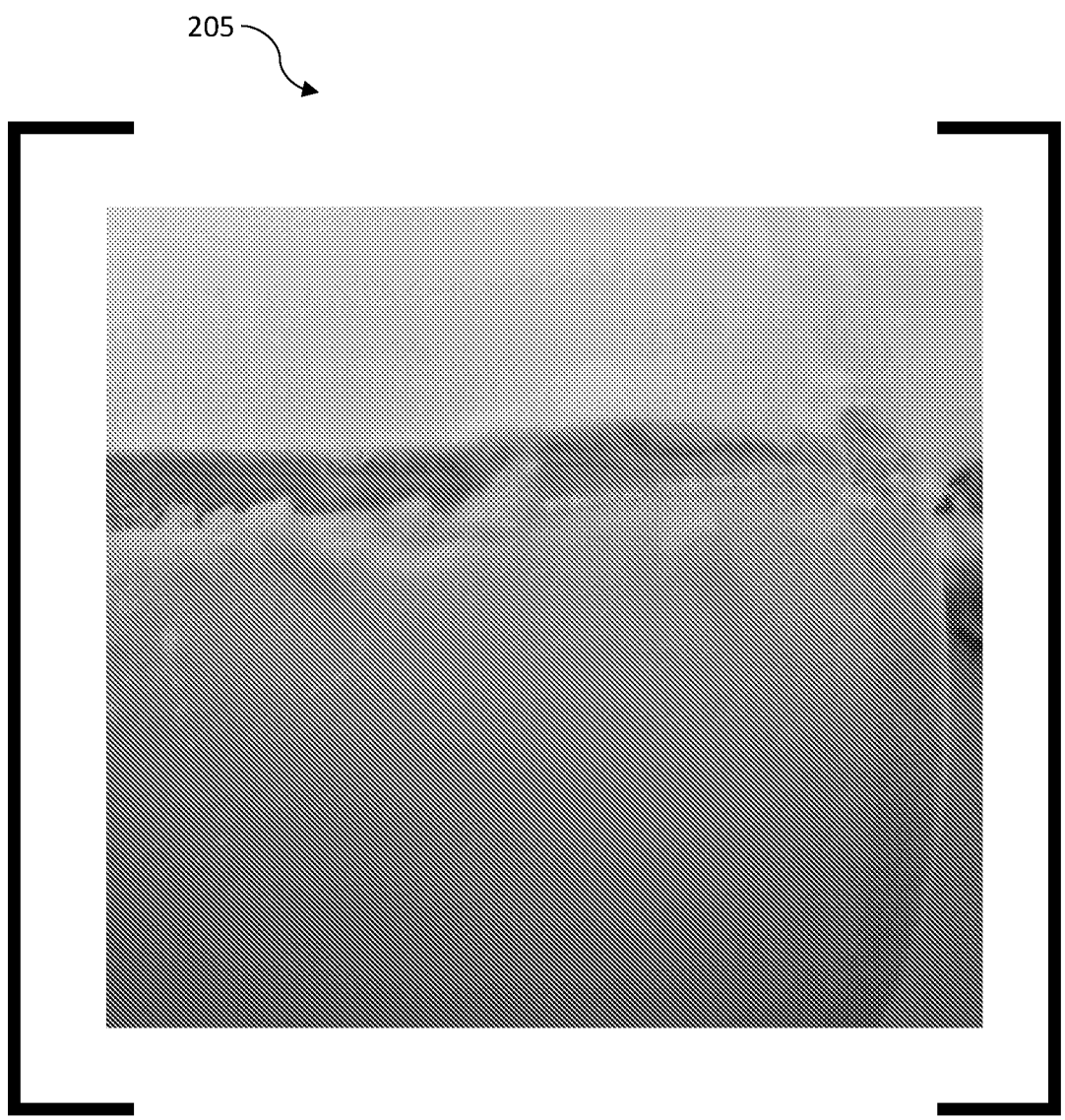
FIG. 2 depicts a photograph of a nanofiber mat that can be produced according to the methods and systems disclosed herein.

A photograph of the collected fiber 205 is illustrated in FIG. 2. The photograph in FIG. 2 illustrates a thick Zirconia nanofiber mat 205. It should be appreciated that in other embodiments, other materials can be used to produce mats of such materials.

In the embodiments disclosed herein, a critical aspect is the power supply 115, which can use a low voltage DC input and inexpensive DC to DC voltage converters with a dual polarity high voltage DC supply. A major advantage realized by this arrangement is that the power supply 115 can be, for example, limited to 4 watts of output power while maintaining a 0 to 40 kV DC and 0 to −20 kV DC output in dual polarity mode, simultaneously from a 9V/12V DC battery or a 12 V DC adapter. Thus, the power supply 115 can be characterized as having a nominal input voltage of 12 V DC, a voltage range of approximately 9 V-32 V DC, an output voltage of approximately 0 to +40 kV DC and 0 to −20 kV DC, indefinite output short-circuit protection, and ripple of 0.02.

Figure 3A:
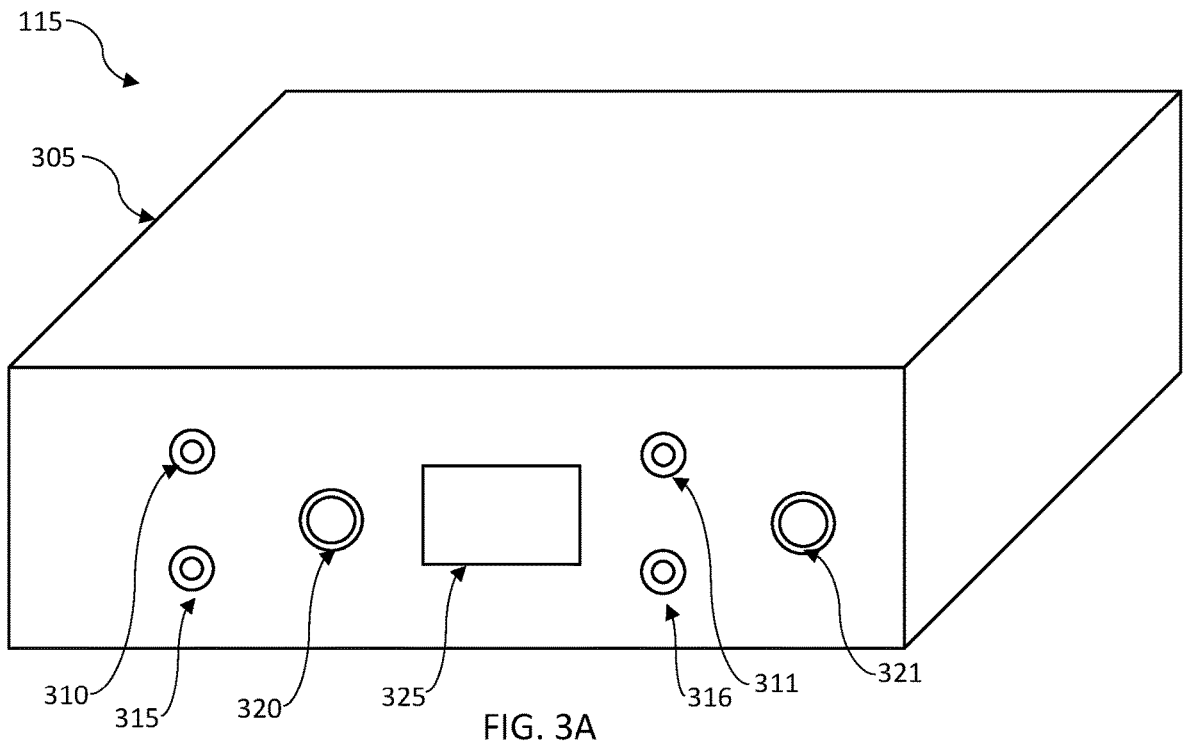
FIG. 3A depicts a dual power supply, in accordance with the disclosed embodiments.
Figure 3B:
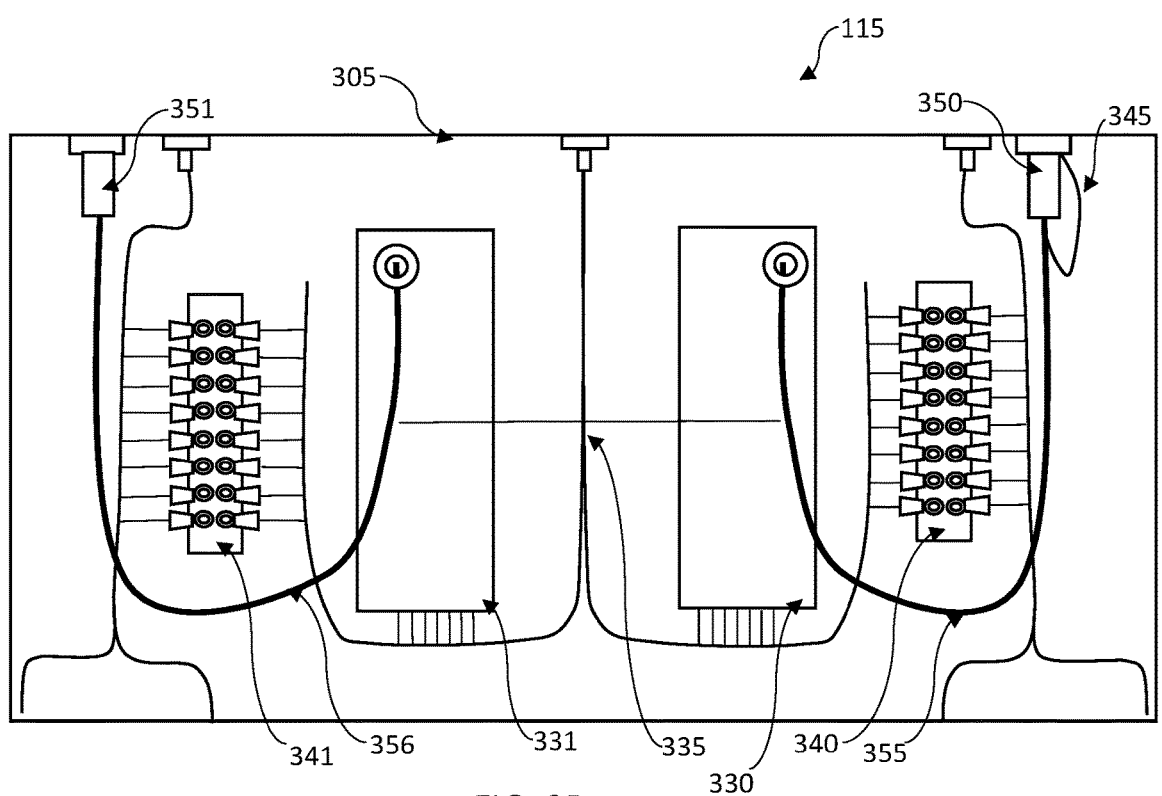
FIG. 3B depicts a dual power supply, in accordance with the disclosed embodiments.

FIGS. 3A and 3B illustrate an exemplary embodiment of the dual power supply 115. Two power units (one +40 kV and one −20 kV) can be assembled inside a housing 305 as illustrated in FIG. 3A. It should be understood that housing 305 can comprise a metal box, or other such housing. Each power unit has an individual potentiometer to vary input voltage, which, in turn, can be used to vary the high voltage output from approximately 0-40 kV DC. A potentiometer 320 can be provided for the first power supply and a second potentiometer 321 can be provided for the other power supply in the housing 305. The housing 305 can further include a display 325. The housing can provide a voltage sensor port 310 and current sensor port 315 associated with one power supply, and a second voltage sensor port 311 and current sensor port 316 associated with the other power supply.

FIG. 3B shows inside the assembled power supply 115. The power supply 115 includes two high voltage converters (one positive high voltage converter 330 and one negative high voltage converter 331) connected with a connector junction 335. The positive high voltage power converter 330 is connected to a high voltage DC output 355. The negative high voltage power converter 331 is connected to a high voltage DC output 356 The positive voltage converter 330 has a junction box 340 for connecting to the potentiometer, voltage, and optional voltage/current display. Likewise, the negative voltage converter 331 has a junction box 341 for connecting to the potentiometer, voltage, and the optional voltage/current display. The output voltage/current sensing ports can be connected to the digital display unit 325 for easy readability.

As illustrated in FIG. 3B, the voltage supply assemblies are simple and connections can be made easily, without the need for complicated printed circuit boards, although in certain embodiments PCBs can alternatively be used. The grounding wire 345 can be connected to the box 305 for safety purposes. Likewise, spark protection lug 350 and spark protection lug 351 can be provided. It is important to select an appropriate length for the spark protection lugs 350 and 351, and to maintain safe distances between the high voltage cable and exposed wire to the nearby ground/metal surface.

It should be appreciated that the dual polarity power supply assembly 115 illustrated in FIGS. 3A and 3B is useful for producing a thicker nanofiber mat. The embodiments disclosed herein can use the dual polarity high voltage assembly 115 such that one polarity drives the nanofiber production while the opposite polarity is used for the negatively charged ions, which results in the Corona discharge through the specially arranged needle array. Dual polarity also results in an effective potential drop of up to 60 KV DC. Such high potential is necessary for mass producing larger nanofiber mats using a needleless spinneret system as further detailed herein.

Figure 4:
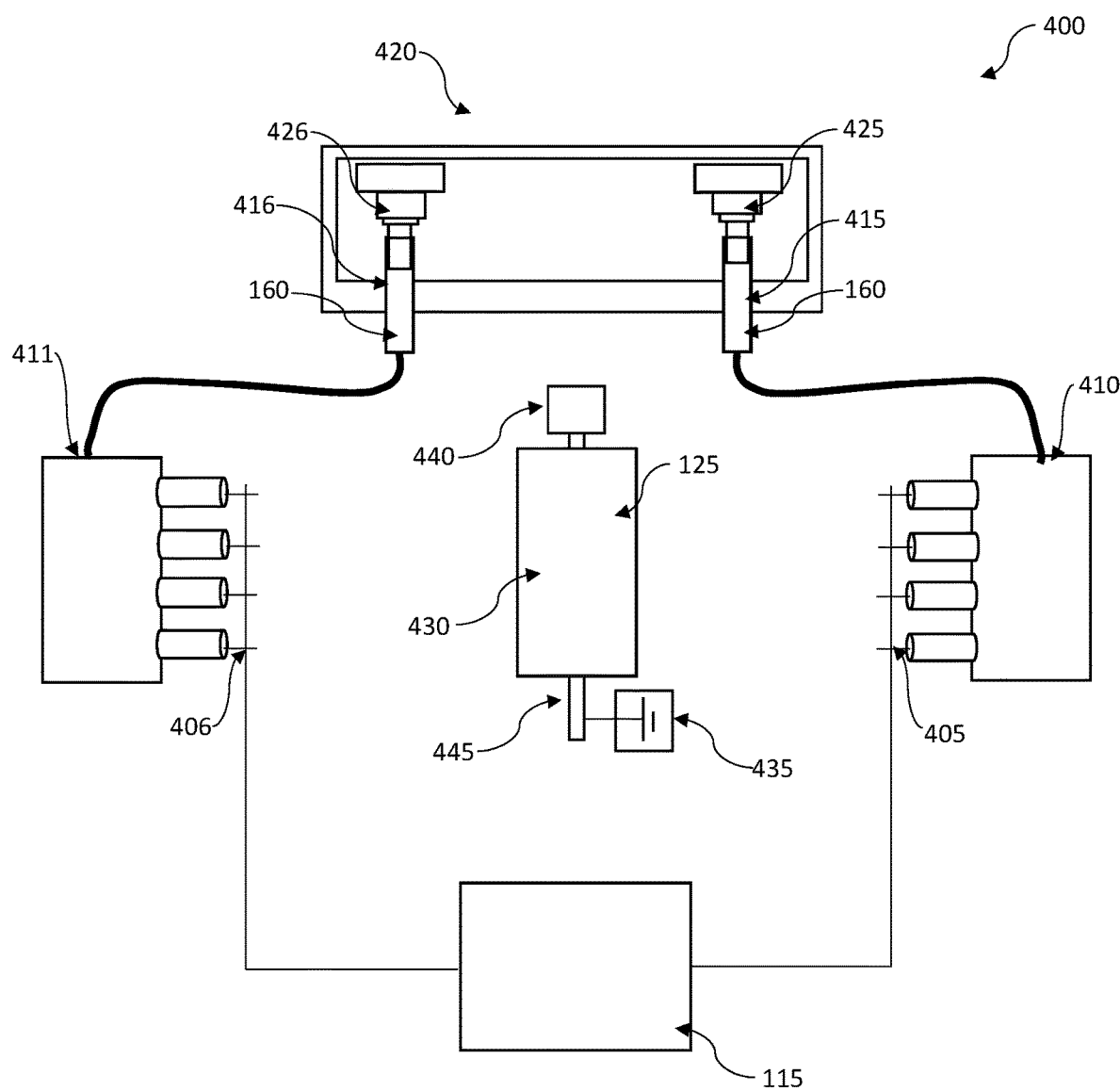
FIG. 4 depicts a block diagram of an electrospinning system, in accordance with the disclosed embodiments.

FIG. 4 illustrates another embodiment of a dual source electrospinning system 400. Thick fiber mat production can be achieved using the system 400, illustrated in FIG. 4. The system 400 comprises two sets of syringe needles held at opposite polarities. In FIG. 4, positive syringe needles in needle array 405 and negative syringe needles in needle array 406 are shown.

As in FIG. 1, needle array 405 and needle array 406 are supplied liquid 160 via manifolds which are connected to the needle arrays. In this embodiment, the first manifold 410 is connected to syringe 415 and the second manifold 411 is connected to syringe 416. Liquid 160 in the syringes 415 and 416 is pumped with the solution dispensing assembly 420. In this embodiment, the syringe pump is equivalent to that illustrated in FIG. 1, except that the syringe pump assembly includes two actuators, actuator 425 and actuator 426, that can pump liquid 160 to the respective needle arrays 405 and 406.

Note the number of needles in needle array 405, or needles in needle array 406, and the syringe arrangement can be adjusted according to the application. The optimum distance between the individual needles needs to be maintained as previously disclosed. The holder can be specially manufactured (e.g., 3D printed or otherwise produced), to hold the syringe 415 and the syringe 416 in order to facilitate the pumping of oppositely charged solution 160 using the syringe pump.

A spinning drum 430 can be connected to ground 435 so that the drum 430 is kept at ground potential. A motor 440 can be connected to a drive shaft 445. The motor 440 turns the spinning drum 430 at the desired rate. The oppositely charged solution 160 is dispensed from the needles in needle array 405 and needles in needle array 406 toward the rotating drum 430 where it collects as a fiber mat.

FIG. 5 illustrates another embodiment in which a thick fiber mat (as described with respect to previous embodiments) is produced using a syringeless spinneret system 500. In some syringe-based mass production applications, the syringe needle can cause a bottleneck as the syringes clog. Such clogs waste time and create production overhead because frequent cleaning is necessary. As such, in the embodiments illustrated in FIG. 5A-C, a syringeless spinneret system 500 is disclosed. The system 500 uses a rotating spindle 505 with a series of metallic spikes 510, arranged in a helical pattern (or other pattern in other embodiments).

The rotating spindle 505 (and associated rotating helix of metallic spikes in spike array 510) is held at a high +Ve potential with a power supply 115. The rotating spindle 505 rotates inside a tank 515 filled with the desired solution 160. The solid spike array 510 (e.g., solid needles) rotate through the solution 160, picking up solution 160 as they pass.

As in other embodiments, a rotating drum 520 is connected to ground 525 and is held at ground potential. A motor 530 connected to drive shaft 535 can be used to turn the rotating drum 520, where the fiber mat collects. Likewise, a motor 540 connected to a spindle shaft 545, and drive shaft (not shown) can be used to turn the rotating spindle 505.

The spindle 505 turns such that the solid spikes 510, with liquid 160, deposited thereon, rotate out of the tank 515 and generally toward an array of dry micro-tip needles 550 (necessary for the Corona discharge). The array of micro tip needles 550 can comprise tungsten (or other such metal). The array of micro tip needles 550 can be maintained at high −kV potential with power supply 115. The potential can be just below the air breakdown voltage. The micro-tip needle array 550 is used for −Ve ion production to neutralize positively charged nanofiber that collects on drum 520 and thereby facilitates a thicker mat.

The liquid 160 is attracted to the rotating drum 520 as a result of the potential difference. The liquid stream bridges the space between the solid spikes 510 and the rotating drum 520, resulting in a nanofiber mat 125. The high voltage, spiked spindle 505 can be electrically isolated from the motor 540 driving its rotation by an insulated coupler 555. The insulated coupler 555 is configured to be long enough to prevent arching between the drive shaft (not shown) and the spindle shaft 545.

Figure 5A:
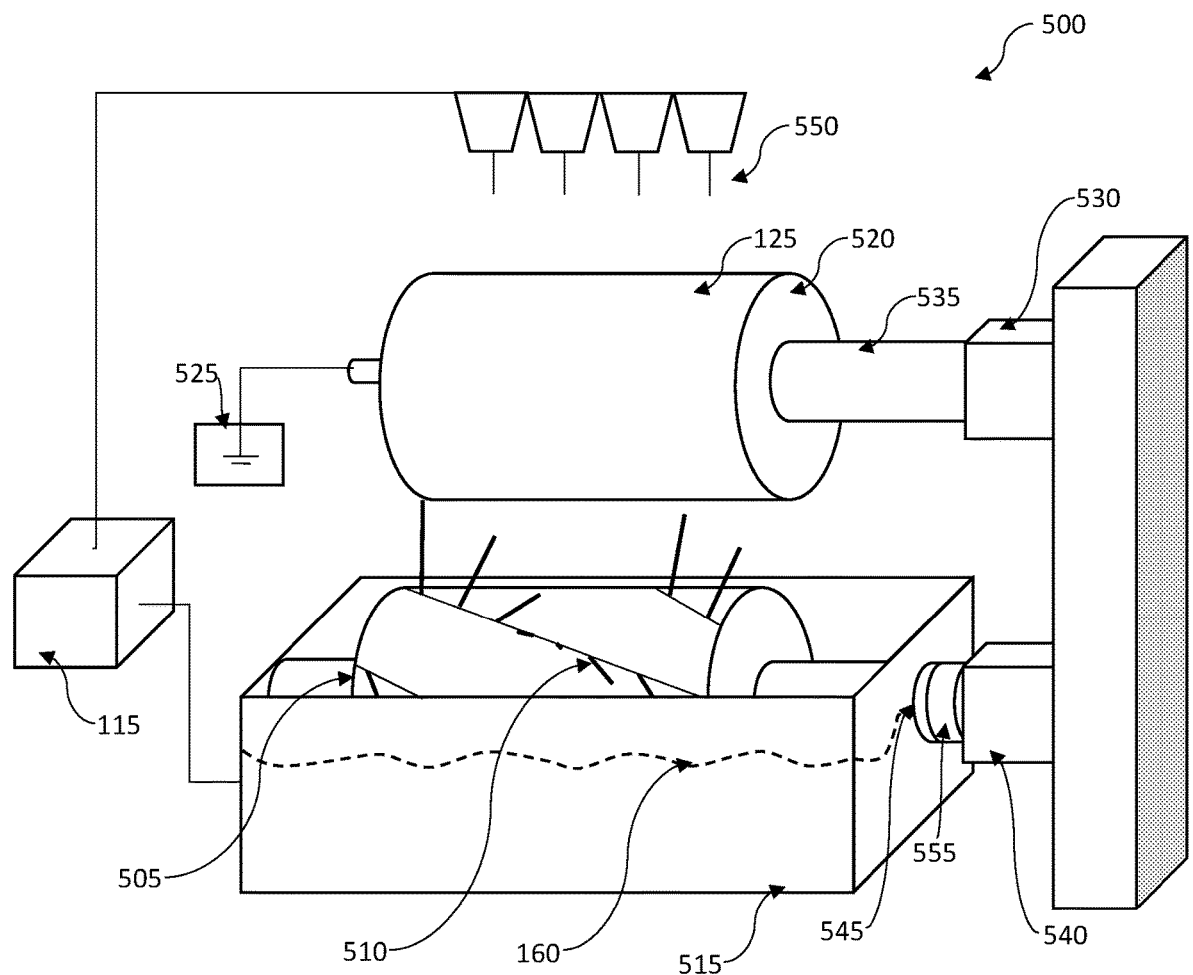
FIG. 5A depicts a block diagram of an electrospinning system, in accordance with the disclosed embodiments.
Figure 5B:
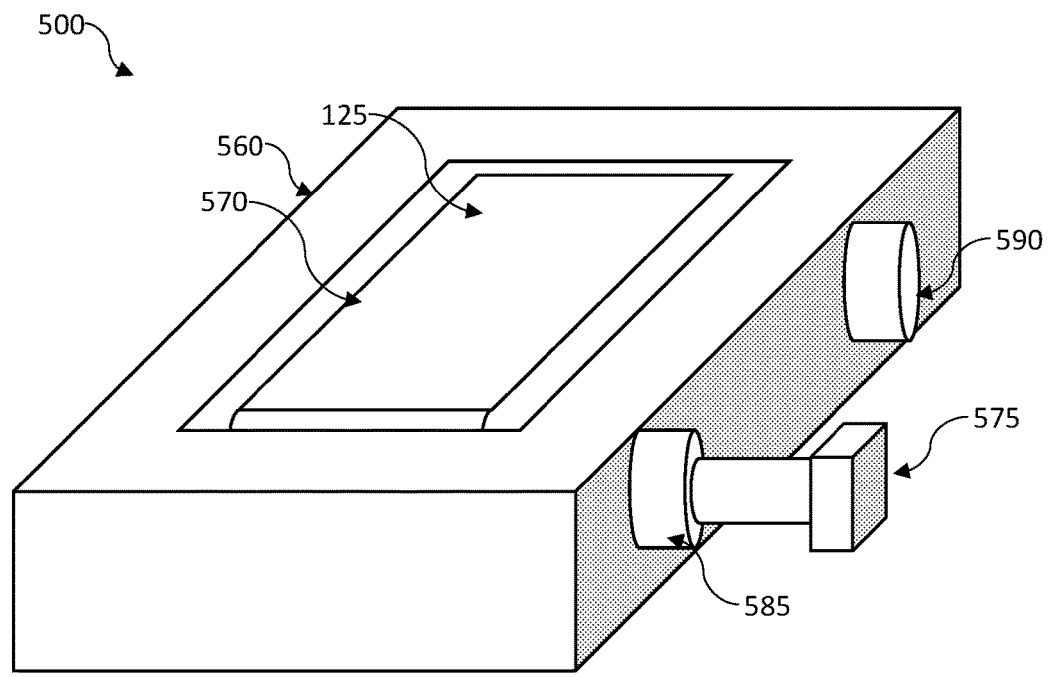
FIG. 5B depicts a block diagram of another aspect of an electrospinning system, in accordance with the disclosed embodiments.
Figure 5B:
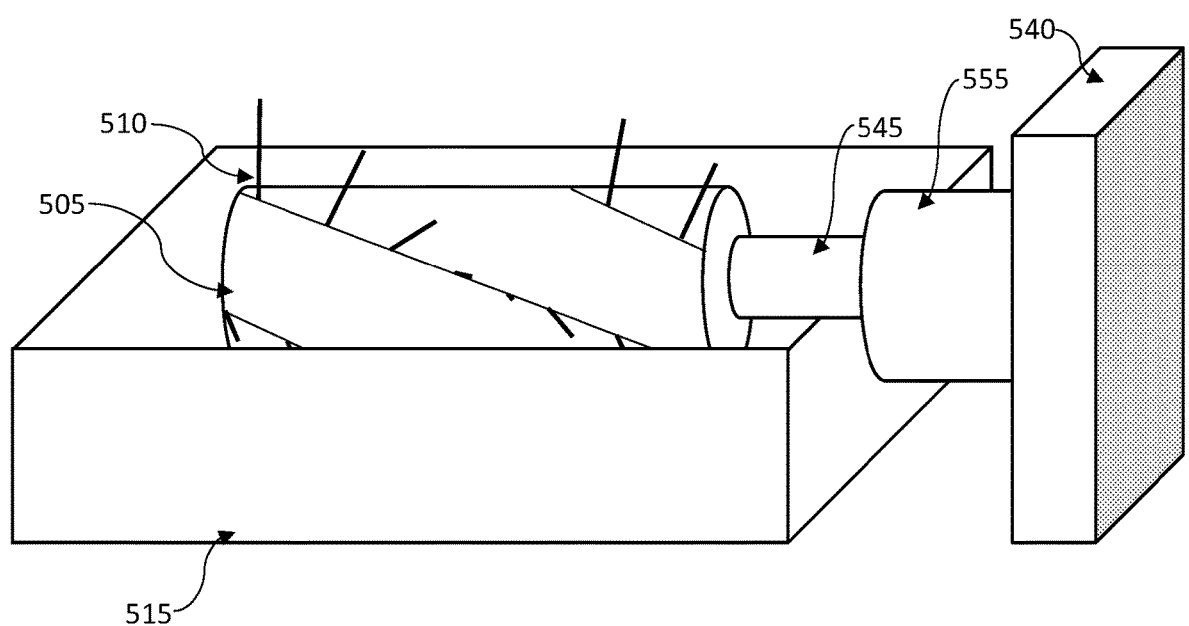
Figure 5C:
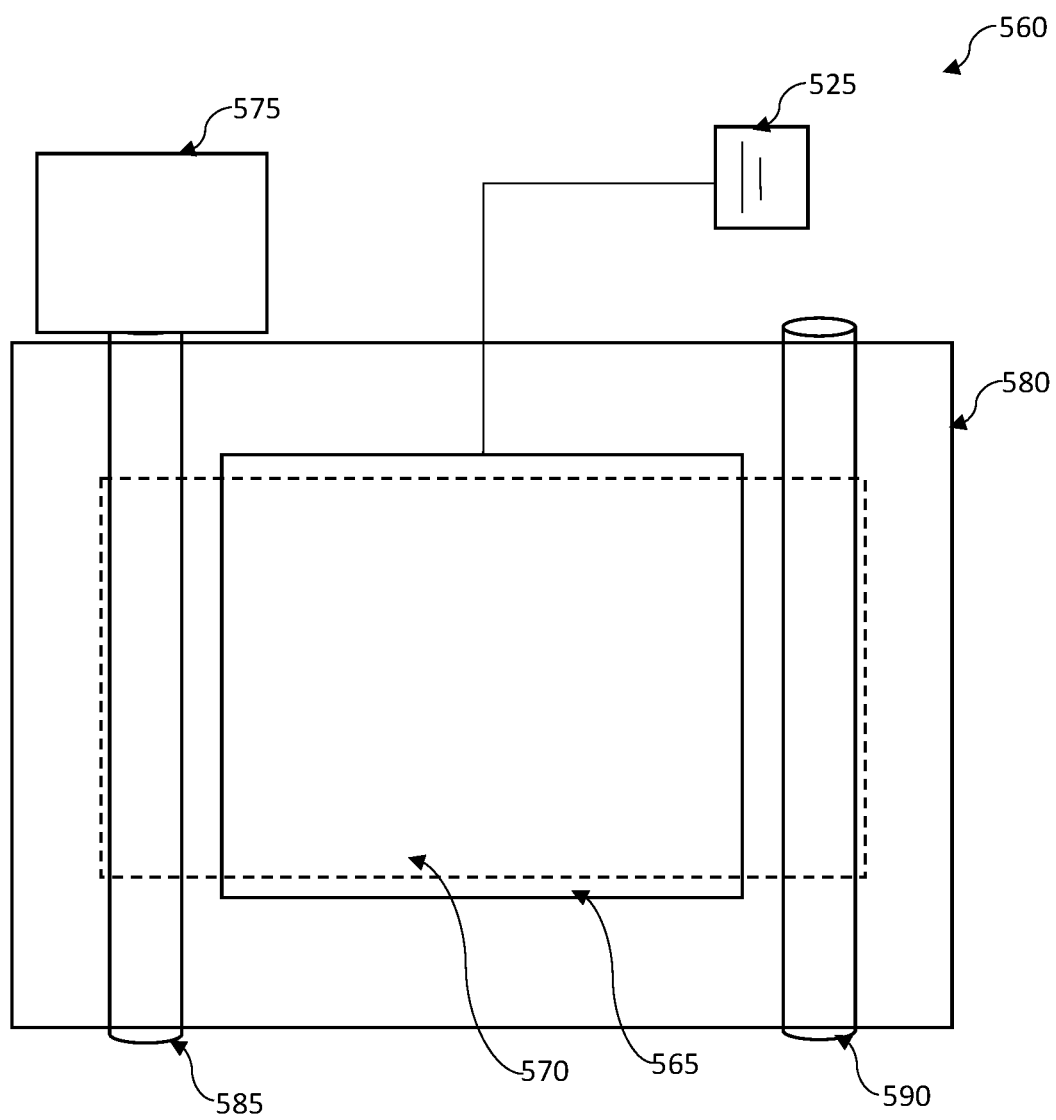
FIG. 5C depicts a bottom view of a conveyor belt assembly associated with an electrospinning system, in accordance with the disclosed embodiments.

The embodiments illustrated in FIGS. 5A-C can be of particular value because nanofibers are increasingly used as functional textiles. In mass production applications, the system 500 can be used for depositing thicker nanofiber on an underlying non-conducting moving fabric.

For example, in FIG. 5B an embodiment of a system 500 is illustrated, that takes advantage of a moving fabric. In the embodiment, a conveyor belt assembly 560 can be used. The conveyor belt assembly 560 includes a conveyor belt 570 comprising a rubber material or other non-conducting fabric. A ground plate 565 is fixed beneath the conveyor belt 560. Nanofibers in solution 160, attracted toward the ground plate 565, are collected by the conveyor belt 560 (e.g., non-conducting fabric) moving in front of the ground plate 565, while a set of negatively charge ions produced by corona discharge (as described herein) are directed to the top portion of the conveyor belt 560.

FIG. 5C illustrates a bottom view of the conveyor belt assembly 560. The conveyor belt assembly 560 includes a housing 580 for the ground plate 565 which is connected to ground 525. The housing 580 further holds a drive shaft 585 and a spinning shaft 590. The drive shaft 585 is driven by motor 575 and is used to cycle the conveyor belt 570.

Figure 6A:
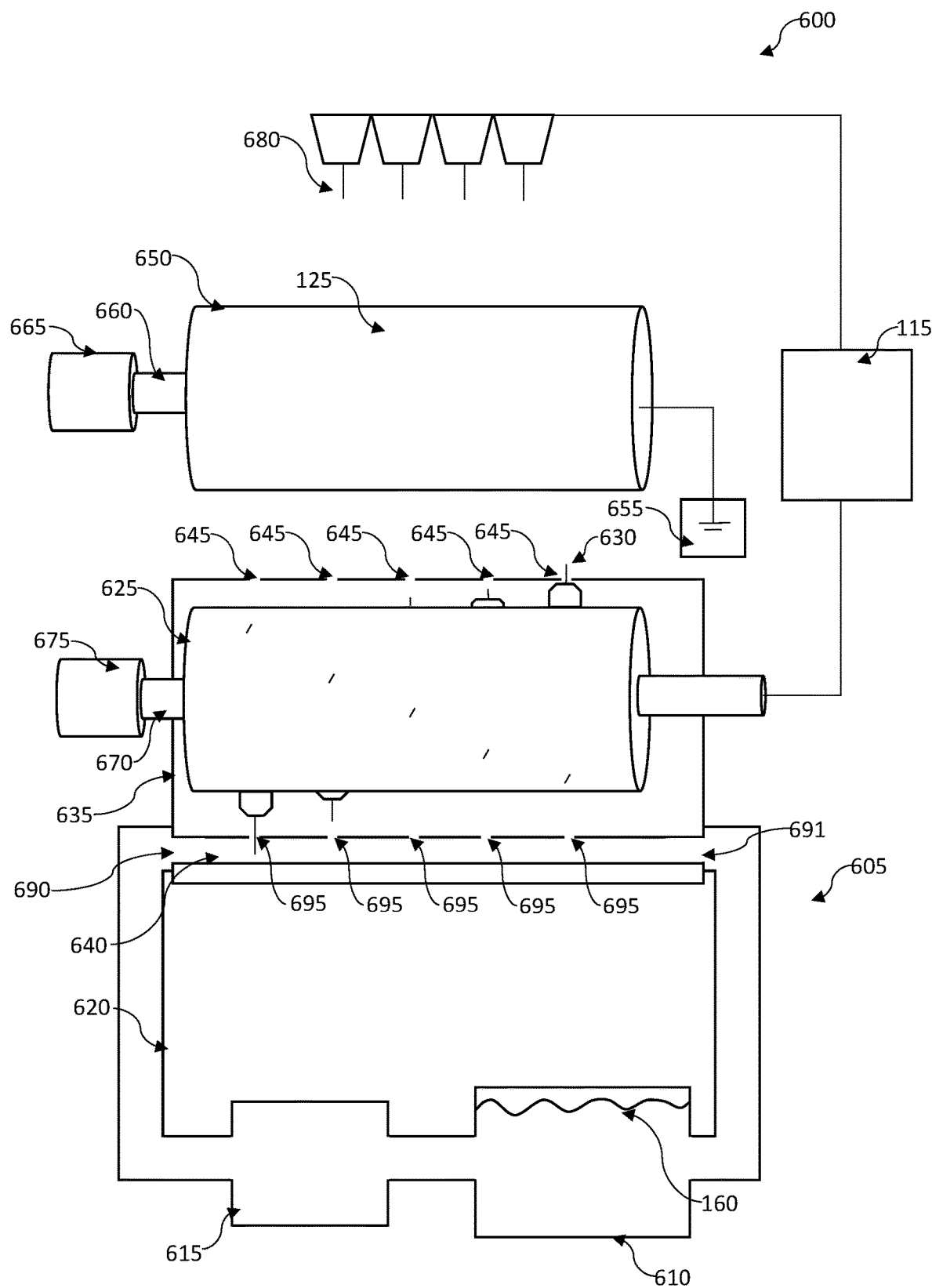
FIG. 6A depicts a block diagram of an electrospinning system, in accordance with the disclosed embodiments.

FIG. 6A illustrates another embodiment of a syringeless mass production system 600 for thick nanofiber mats 125. In the system 600, a circulation assembly 605 is used for continuously circulating solution 160 through conduit 620. The conduit 620 connects to fluid input 690 that is fluidically connected to an internal grove 640 in dispenser 635. The configuration is intended to prevent the solution 160 from drying in the dispenser 635.

A pump 615, which can be embodied as a peristaltic pump, is used to pump solution 160 from the solution tank 610 through the conduit 620, to the dispenser 635, out the fluid exit 691, and back to the solution tank 610. Such an enclosed design for solution flow overcomes the major problem of solution drying in syringeless electrospinning. In this embodiment, only a very small quantity of solution 160 is exposed to air, which prevents long term changes in concentration of the liquid 160.

The conduit 620 can be connected to, and/or formed in, the dispenser 635 that encapsulates the rotating cylinder 625 with multiple solid needles or spikes, in a spike array 630. The spikes in spike array 630 can be formed in even rows, in a helical pattern around the cylinder 625, or in other patterns on the cylinder 625.

Internal groove 640 is formed in the dispenser 635 along the path of the spikes in spike array 630. The internal groove 640 can include slits 695, so that the spikes can pick up solution 160 flowing through the groove 640. FIG. 6C provides a cut out view of the dispenser 635.

Once the spikes in spike array 630 pick up solution 160 flowing through groove 640, the rotation of cylinder 625 brings the spikes in spike array 630 to their top or upward pointing position, through slits 645 on the top surface of dispenser 635, where the liquid is stretched into nanofiber. FIG. 6D illustrates a cut away view of the cylinder 625 positioned in the dispenser 635. FIG. 6E illustrates the closed dispenser 635 with slits 645 exposing spikes in spike array 630 as the cylinder 625 rotates. The rotating cylinder 625 is driven by drive shaft 670 connected to motor 675.

As in the other embodiments, the solution 160 on the tip of the spikes 630 is drawn to a rotating drum 650 (or a conveyor belt assembly 560) by a potential difference. The rotating drum 650 is connected to ground 655 and is turned via a drive shaft 660 connected to a motor 665. The rotating cylinder 625 can be held at a high positive kV potential with a dual power supply 115.

The power supply 115 can be further connected to an array of one or more dry micro-tip needles 680 (necessary for the Corona discharge). The array of micro-tip needles 680 can comprise tungsten (or other such metal). The array of micro-tip needles 680 can be maintained at high −kV potential with power supply 115. The potential can be just below the air breakdown voltage. The micro-tip needle array 680 is used for −Ve ion production to neutralize positively charged nanofiber that collects on drum 650 and thereby facilitate a thicker mat of material 125.

Figure 6B:
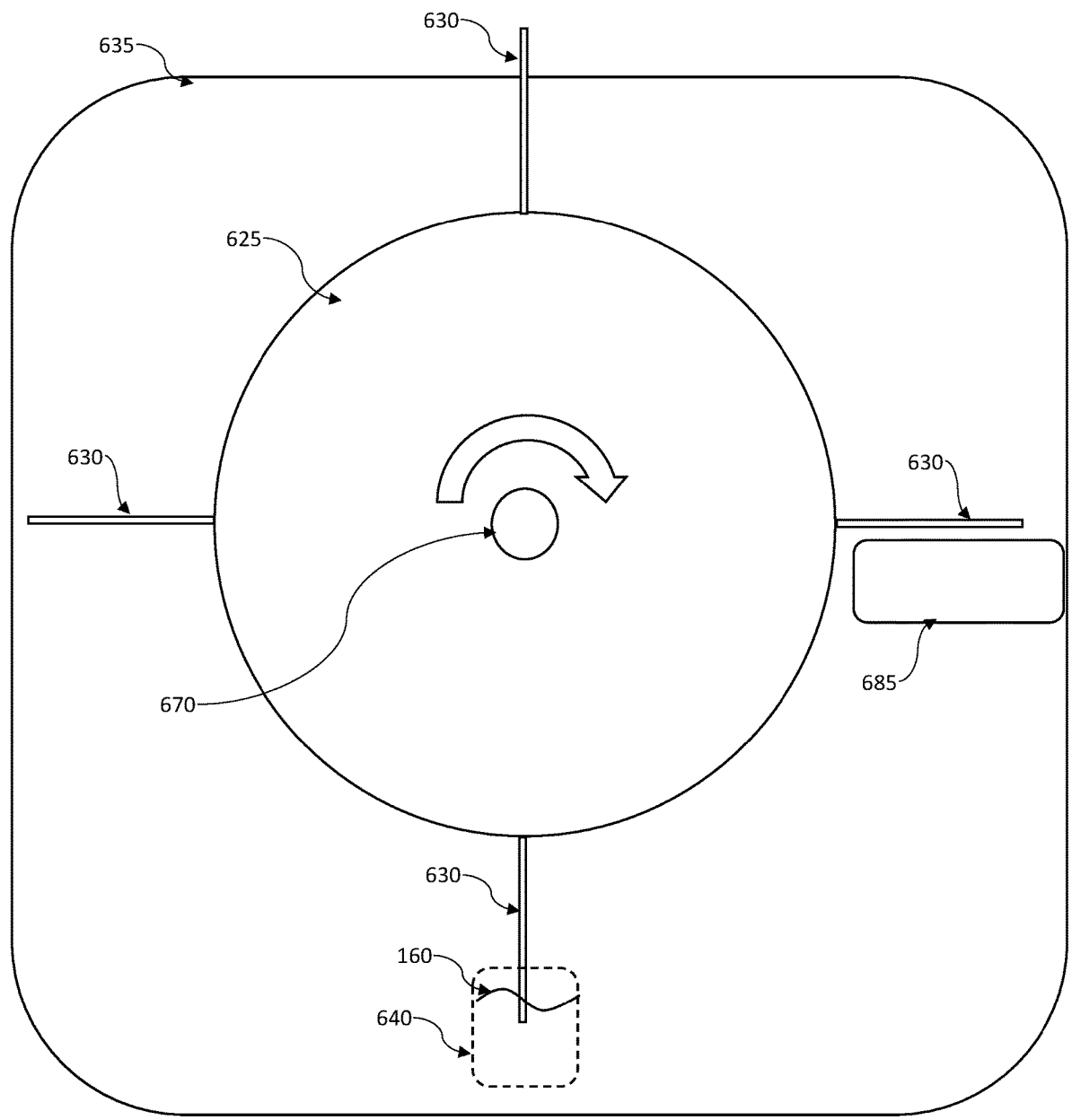
FIG. 6B depicts an elevation view of an electrospinning component, in accordance with the disclosed embodiments.
Figure 6C:
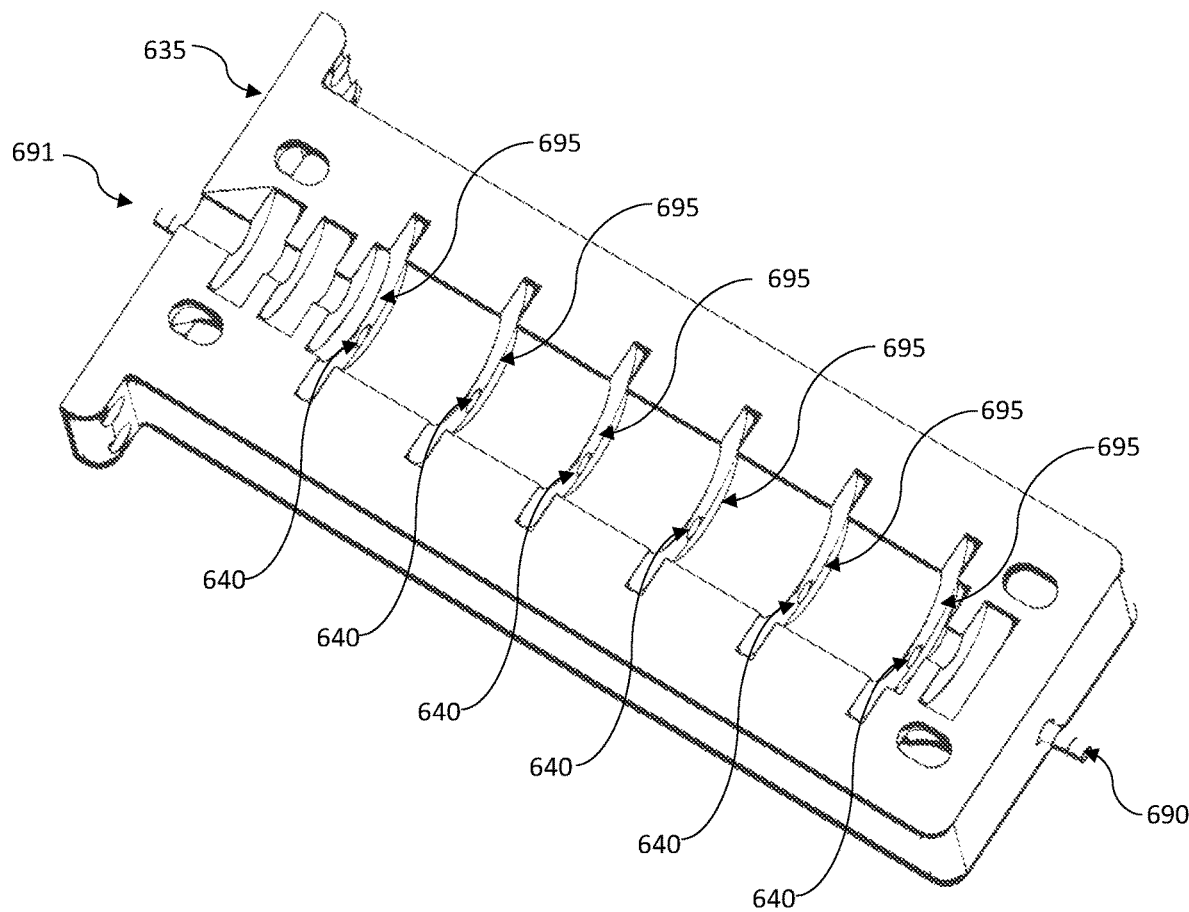
FIG. 6C depicts a cutaway view of a dispenser associated with an electrospinning system, in accordance with the disclosed embodiments.
Figure 6D:
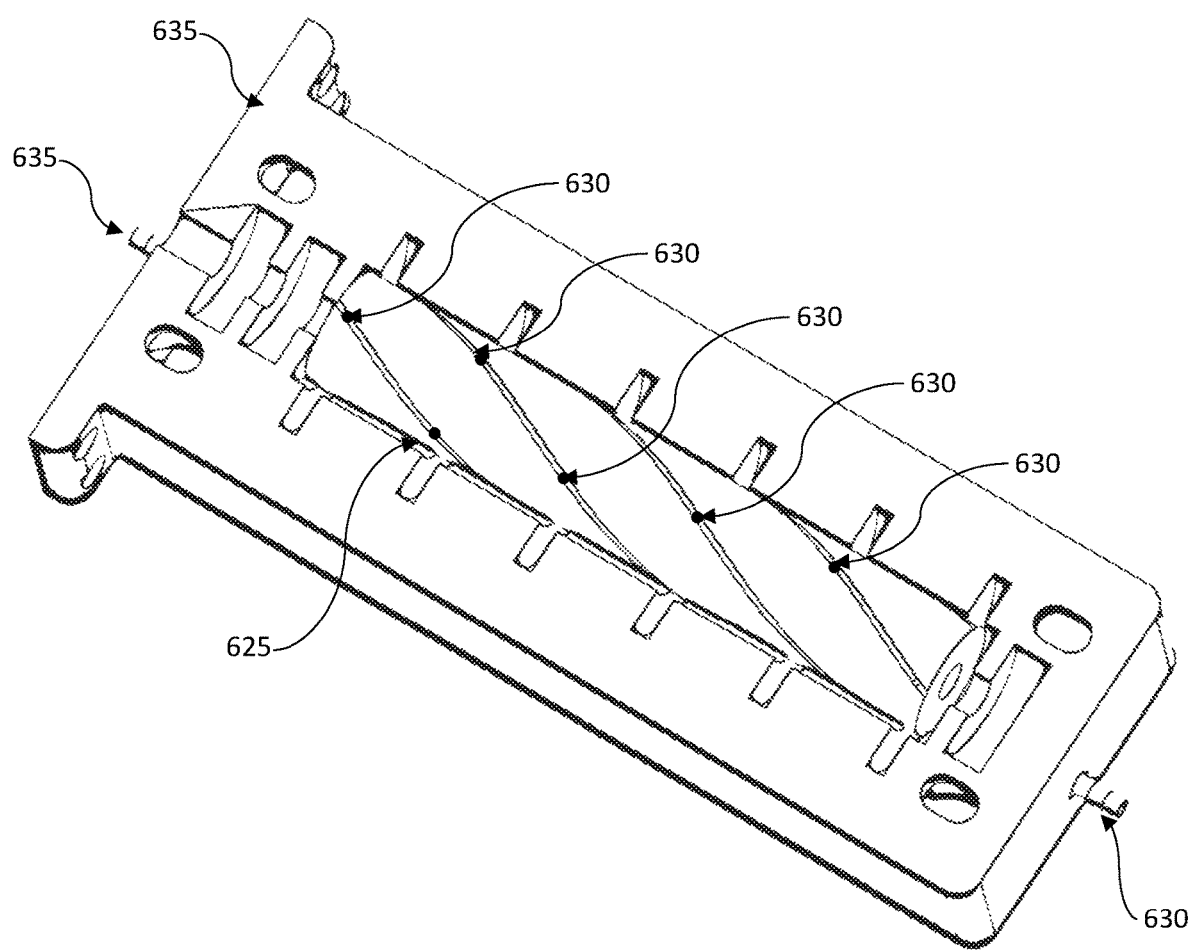
FIG. 6D depicts a cutaway view of a dispenser and a rotating cylinder associated with an electrospinning system, in accordance with the disclosed embodiments.
Figure 6E:
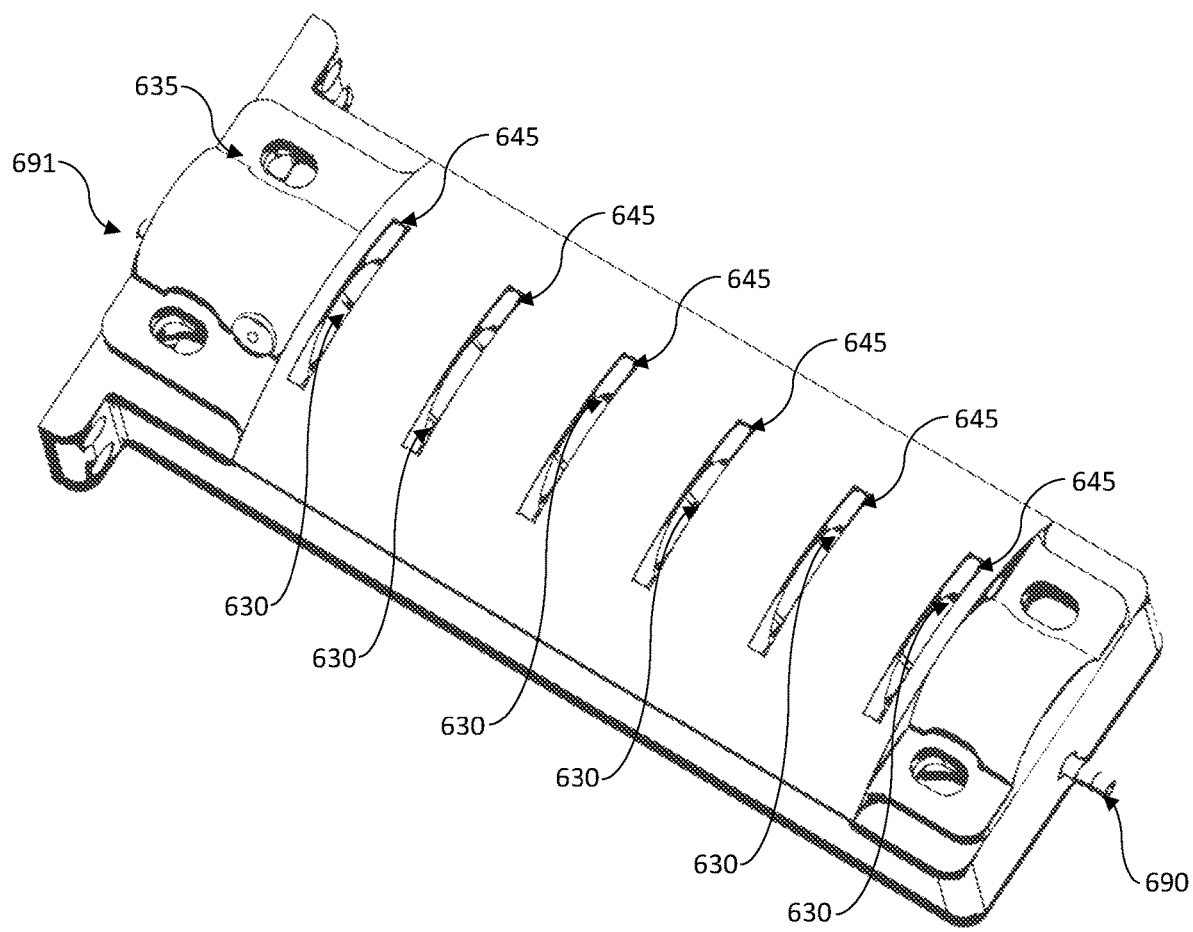
FIG. 6E depicts a view of a dispenser associated with an electrospinning system, in accordance with the disclosed embodiments.

The system 600 further includes a cleaning material 685 formed in the dispenser 635, formed in the path of the spikes in spike array 630 as they return to internal grove 640, as illustrated in FIG. 6B. The cleaning material 685 can comprise a soft material that wipes the residual fluid from the spikes in the spike array 630. The cleaning material 685 is arranged such that the rotating spike array 630 brushes against the cleaning material 685 while rotating, so as to prevent formation of any solid layer of solution on the spikes in spike array 630.

The system 600 provides circulation that prevents the solution 160 from drying in the dispenser 635. In addition, after some amount of electrospinning, the density of the solution changes which can result in larger nanofibers. The disclosed circulation provided by system 600 through the narrow internal grooves, results in limited exposure to air, thereby maintaining a more stable solution 160 density. Finally, the soft cleaning material 685 is provided so that the spikes 630 do not accumulate solution 160, which can solidify over time.

Figure 7:
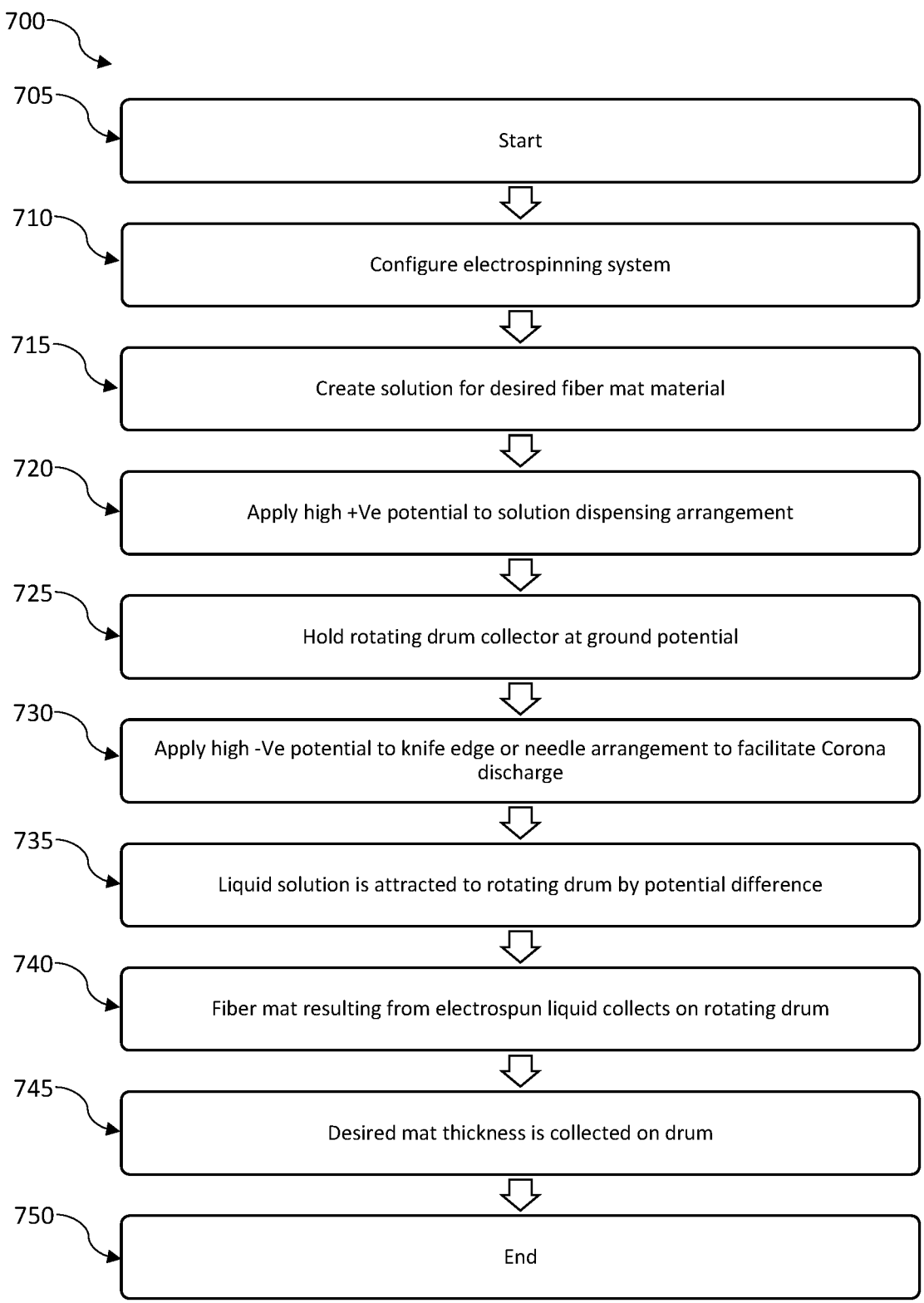
FIG. 7 depicts steps associated with a method for producing a nanofiber mat, in accordance with the disclosed embodiments.

FIG. 7 illustrates a flow chart illustrating steps associate with a method 700 for fabricating fiber mats with electrospinning. The method begins at step 705. At step 710, an electrospinning system, in accordance with any of the embodiments disclosed herein, can be configured. The electrospinning system can take advantage of a dual polarity source as disclosed in the various systems detailed herein. At step 715, a solution can be created for the desired mat fiber material. Possible precursor solutions include Alumina→Aluminum 2,4-pentadionate+Aceton, Zirconia→Zirconium Carbonate+Acetic Acid, $WO_3$→Ammonium metatungstate+D.I. Water, and $TiO_2$→Titanium Isopropoxide. These solutions can be added with polymeric solution containing approximately 5-8 wt % of polyvinylpyrrolidone in Acetone or Ethanol.

Once the solution is ready, a high positive potential can be supplied to the solution dispensing arrangement at step 720. As disclosed herein, in some embodiments, the solution dispensing arrangement can be one or more needles. In other embodiments, the solution dispensing arrangement can comprise a rotating spindle with associated solid needles or spikes that are dipped into a pool of solution. The rotating drum collector can be grounded as shown at step 725, and a high negative potential can be supplied to a knife edge or needle arrangement as illustrated at step 730 to facilitate Corona discharge, resulting in a thicker fiber mat.

As shown at step 735, the liquid solution is attracted to the rotating drum by the potential difference. As the liquid passes through the air, it is pulled into a fiber that is collected on the rotating drum as shown at step 740, resulting in a fiber mat. The process continues until the fiber mat is of a desired thickness as shown at step 745, at which point the method ends at step 750.

Figure 8A:
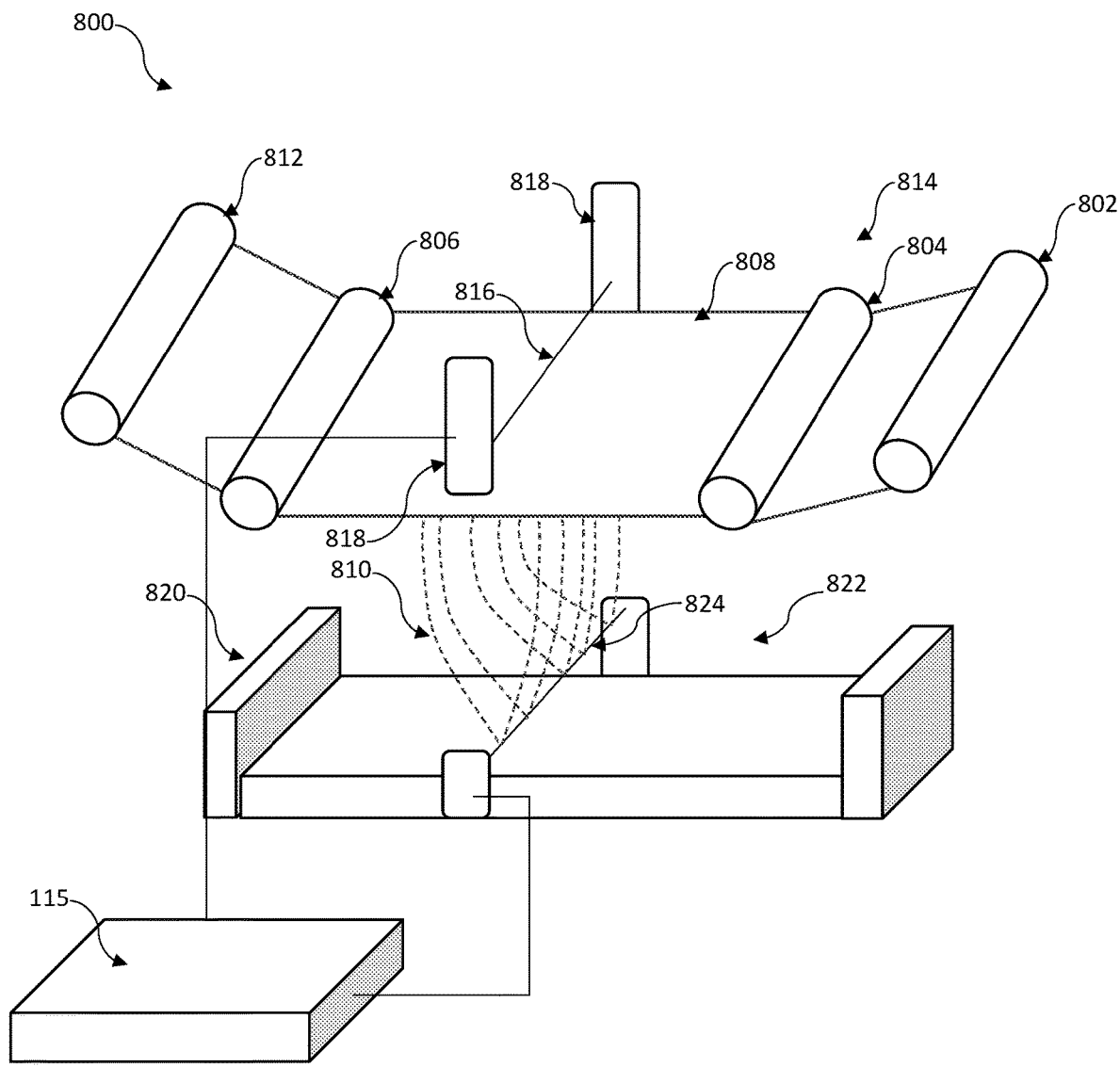
FIG. 8A depicts another embodiment of an electrospinning system, in accordance with the disclosed embodiments.
Figure 8B:
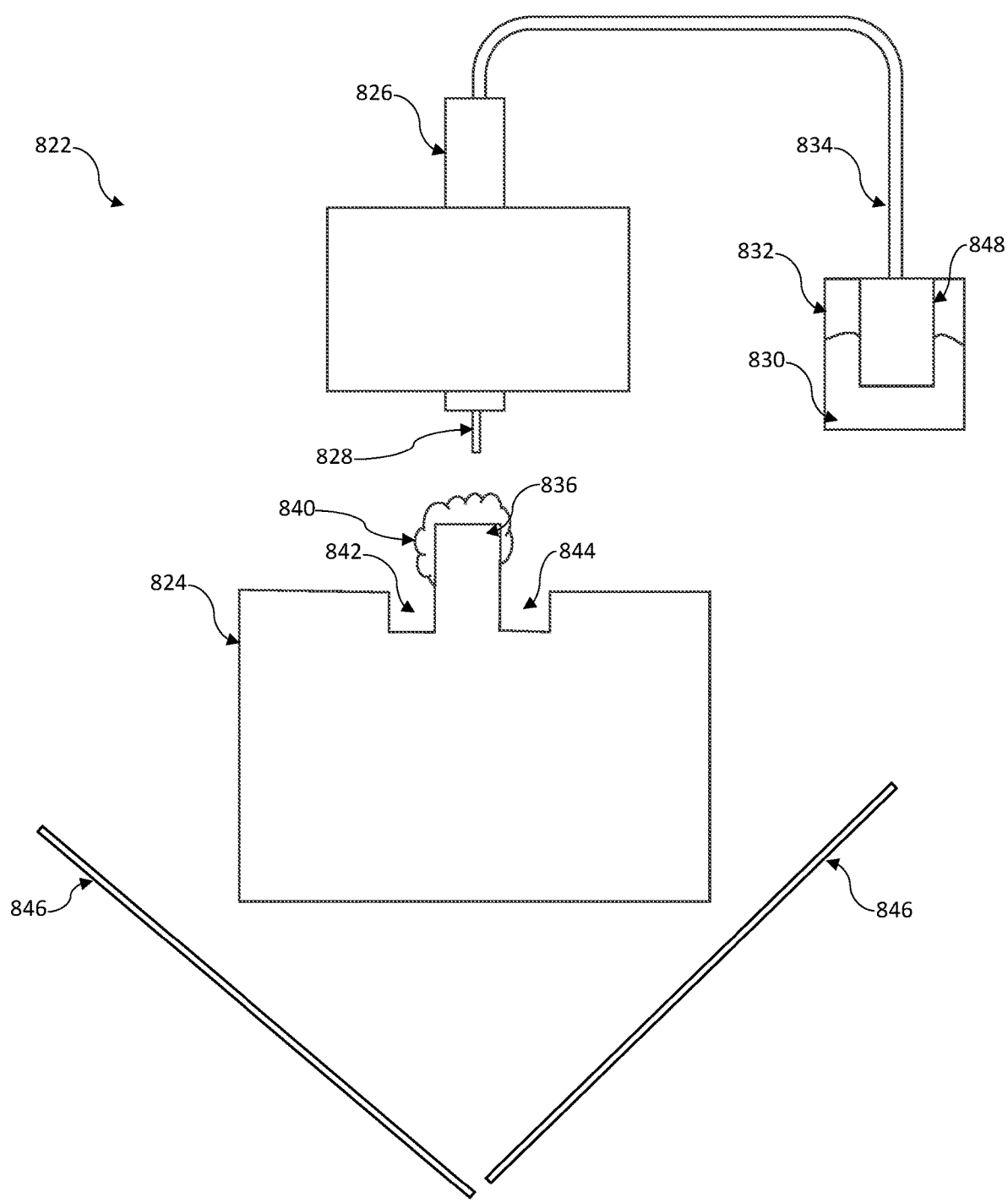
FIG. 8B depicts an elevation view of a slider associated with an electrospinning system, in accordance with the disclosed embodiments.
Figure 8C:
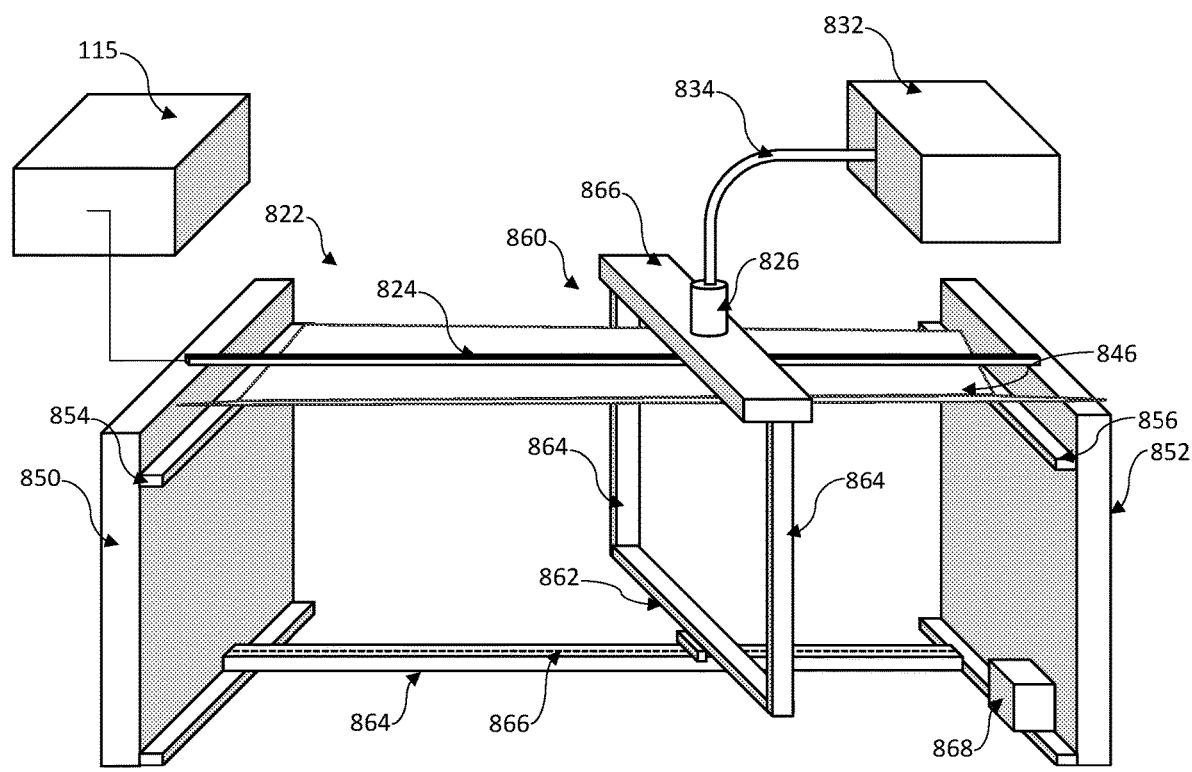
FIG. 8C depicts another view of aspects of an electrospinning system, in accordance with the disclosed embodiments.

FIGS. 8A-8C illustrate aspects of a wire electrospinning system 800 for nanofiber coating, in accordance with the disclosed embodiments. The system 800 comprises a spooling assembly 814, including a substrate spool 802 which can be driven by rotating the substrate spool 802 with a motor. The spooling assembly 814 further comprises a series of one or more spinning spools, illustrated in FIG. 8A as spinning spool 804 and spinning spool 806, configured to tension the substrate 808 in position for the nanofiber 810 to be coated on the substrate 808. The substrate 808 coated in nanofiber can be spooled on the nanofiber substrate roll 812.

The substrate 808 can comprise non-woven melt-blown polypropylene. The tensioned substrate 808 can pass below a wire 816 held at high voltage with a power supply, such as dual power supply 115. In certain embodiment, the wire 816 can be held at a DC voltage of up to 10 kV. The wire can be held between two risers 818.

Below the substrate 808, a nanofiber dispenser 820 is configured to dispense polymer solution as nanofibers 810. The polymer solution can comprise PVDF in 10 wt % DMAC. The nanofiber dispenser 820 includes a slider 822, as further detailed herein. The slider length can be adjusted according to the substrate spool 802 width.

The nanofiber dispenser 820 includes a bar 824 held at opposite high voltage from the wire 816, with a power supply, such as dual power supply 115. The opposing voltages creates a potential difference between the wire 816 and the bar 824. In certain embodiment, the bar 824 can be held at a DC voltage of up to 10 kV.

As illustrated, the difference in potential between the wire 816 and the bar 824 coated with polymer solution, results in the nanofibers being drawn toward the wire 816, from the bar 824 onto the substrate 808, which is positioned below the wire 816. The polymer solution coats the substrate 808 as it passes overhead and is spooled, creating a nanofiber mat on the substrate 808.

FIG. 8B illustrates an elevation view showing aspects of the slider 822. The slider 822 includes a syringe 826 with a needle 828. The polymer solution 830 is pumped with pump 848 from solution tank 832 to the syringe 826 via tubing 834. The syringe 826 is fixed on a sliding frame as further detailed herein.

Solution droplets are dispensed form the needle 828 and fall on a projection portion 836 of bar 824. The bar 824 generally includes the projection portion 836 comprising a thin strip, with trough 842 on one side and trough 844 on the other side. The projected portion 836 is kept at higher level than the other surfaces of the bar 824 so less input voltage is required, and nanofiber will only initiate transportation from the associated elevated edges. The solution gathers on the bar 824, wetting the surface with dispensed solution 840, on the projection portion 836 and along the edge. The dispensed solution 840 can overflow the projection portion.

Due to sharp corner on the edges of the projection portion 836, there will be charge concentration which will be much higher than the applied voltage (e.g., 40 kV). Even a lower than 40 kV potential is required to initiate free surface electrospinning from the bar 824 due to charge concentration effect at the edges of the projection portion 836.

Reflector plates 846 are positioned below the bar 824. In certain embodiments, the reflector plates 846 can comprise aluminum reflector plates 846 which are maintained at high potential matching that of the bar 824. This ensures that the nanofibers are drawn upward and not attracted towards the ground below.

FIG. 8C illustrates aspects of the slider 822 in accordance with the disclosed embodiments. The slider 822 includes the bar 824, mounted on slider frame end 850 on one side and slider frame end 852 on the other side. A lip 854 is formed on slider frame end 850, and a second lip 856 is formed on slider frame end 858. The lip 854 and lip 856 are used to hold the reflector plates 846 in position below the bar 824.

A sliding mount frame 860 comprises a bottom rail 862, risers 864, and a top dispenser bar mount 866. The syringe 826 can be mounted through the top dispenser bar mount 866, so that the needle 828 is positioned above the bar 824. The bottom rail 862 can be mounted to a track, rail, or slide 864. In certain embodiments, the track, rail or slide 864 can comprise a pulley or belt 866 configured to be driven by a motor 868. The motor 686 can pull the pulley 866 along the track 864, so that solution can be dispensed along the length of bar 824. With the bar at a high potential, the solution is drawn from the bar 824 upward onto the substrate 808 passing above.

The embodiments disclosed herein provide a much smaller, lighter weight, and simpler electrospinning device than previously known in the art. The embodiments are much safer to use as they can limit the output power to only few watts, and can be operated with a 9V battery as well as 12V DC adapter. The systems and methods disclosed herein further provide a versatile production unit that employs a syringe needled spinneret for prototype nanofiber production, and a needleless helical spinneret for mass production. The embodiments can be used to create thicker ceramic or polymeric nanofiber mats, as compared to prior art approaches, using a specially designed Corona ionizer.

Based on the foregoing, it can be appreciated that a number of embodiments, preferred and alternative, are disclosed herein.

In an embodiment an electrospinning system comprises a power supply, a spooling assembly configured to spool a substrate, a wire held at a voltage above the spooling assembly, a bar held at an opposite voltage below the spooling assembly, and a slider for distributing solution on the bar, wherein solution is drawn from the bar to the substrate via a potential difference between the wire and the bar, forming a fiber mat on the substrate.

In an embodiment, the spooling assembly comprises a rotating substrate spool, at least one spinning spool, and nanofiber substrate spool. In an embodiment, the bar comprises a projection portion, a first trough on a first side of the projection portion, and a second trough on a second side of the projection portion. In an embodiment, the slider comprises a slider frame, wherein the bar is mounted below the slider frame, a bottom rail of the slider frame, a pulley configured in the bottom rail, and a motor operably connected to the pulley configured to change the position of the slider frame.

In an embodiment the electrospinning system further comprises a solution tank configured to supply solution to a syringe fitted with a needle. In an embodiment, the solution comprises a polymer solution. In an embodiment, the substrate comprises a non-woven melt-blown polypropylene.

In an embodiment the electrospinning system further comprises at least one reflector plate, positioned below the bar. In an embodiment, the reflector plate is held at a voltage matching that of the bar. In an embodiment, the power supply comprises a dual polarity power supply.

In an embodiment, an apparatus comprises a dual polarity power supply, a spooling assembly configured to spool a substrate, a wire held at a voltage above the spooling assembly, a bar had at an opposite voltage below the spooling assembly, and a syringe attached to a needle for distributing solution on the bar, wherein solution is drawn from the bar to the substrate via a potential difference between the wire and the bar, forming a fiber mat on the substrate.

In an embodiment, the circulation assembly comprises a solution tank, a pump, and tubing connecting the pump to the dispenser. In an embodiment, the spooling assembly comprises a rotating substrate spool, at least one spinning spool, and nanofiber substrate spool. In an embodiment, the bar comprises a projection portion, a first trough on a first side of the projection portion, and a second trough on a second side of the projection portion. In an embodiment, the slider comprises a slider frame, wherein the bar is mounted below the slider frame, a bottom rail of the slider frame, a pulley configured in the bottom rail, and a motor operably connected to the pulley configured to change the position of the slider frame.

In an embodiment the apparatus further comprises a pair of risers connecting the bottom rail to a top dispenser bar mount.

In an embodiment, the substrate comprises a non-woven melt-blown polypropylene. In an embodiment, the apparatus further comprises at least one reflector plate, positioned below the bar. In an embodiment, the reflector plate is held at a voltage matching that of the bar.

In another embodiment, an electrospinning system comprises a dual voltage power supply, a spooling assembly configured to spool a substrate, a wire connected to the dual voltage power supply and held at a voltage above the spooling assembly, a bar connected to the dual voltage power supply and held at an opposite voltage below the spooling assembly, at least one reflector plate, positioned below the bar and held at a voltage matching that of the bar, and a slider for distributing solution on the bar, wherein solution is drawn from the bar to the substrate via a potential difference between the wire and the bar, forming a fiber mat on the substrate.

In an embodiment, an electrospinning system comprises a power supply, a solution dispensing assembly held at positive potential by the power supply, a Corona discharge assembly held at negative potential by the power supply, and a collector wherein a solution is drawn from the solution dispensing assembly to the collector forming a fiber mat thereon.

In an embodiment, the solution dispensing assembly comprises at least one dispensing needle, a manifold attached to a syringe, the manifold connecting the syringe to the at least one dispensing needle, and a syringe pump for pumping the solution to the at least one dispensing needle. In an embodiment the solution dispensing assembly comprises a solution tank containing the solution, a rotating spindle, at least one solid needle on the rotating spindle, and a motor for rotating the spindle.

In an embodiment, the Corona discharge assembly comprises a plate with a knife edge. In an embodiment the Corona discharge assembly comprises an array of at least one micro-tipped needle.

In an embodiment the collector comprises a drum collector. In an embodiment a ground is connected to the drum collector. In an embodiment the collector comprises a conveyor belt assembly. In an embodiment the conveyor belt assembly further comprises a ground plate, the ground plate being held at ground potential, and a conveyor belt wrapping around the ground plate.

In an embodiment, the power supply comprises a dual polarity power supply.

In another embodiment, an apparatus comprises a dual polarity power supply, a solution dispensing assembly held at positive potential by the dual polarity power supply, a Corona discharge assembly held at negative potential by the dual polarity power supply, and a collector wherein a solution is drawn from the solution dispensing assembly to the collector forming a fiber mat thereon.

In an embodiment, the solution dispensing assembly comprises at least one dispensing needle, a manifold attached to a syringe, the manifold connecting the syringe to the at least one dispensing needle, and a syringe pump for pumping the solution to the at least one dispensing needle.

In an embodiment, the solution dispensing assembly comprises a solution tank containing the solution, a rotating spindle, at least one solid needle on the rotating spindle, and a motor for rotating the spindle.

In an embodiment the Corona discharge assembly comprise a plate with a knife edge. In an embodiment the Corona discharge assembly comprises an array of at least one micro-tipped needle.

In an embodiment the collector comprises a drum collector connected to a ground. In an embodiment the collector comprises a ground plate, the ground plate being held at ground potential, and a conveyor belt wrapping around the ground plate.

In yet another embodiment, method comprises holding a solution associated with a solution dispensing assembly at positive potential with a power supply, holding a Corona discharge assembly at negative potential by the power supply, and collecting a fiber mat on a collector wherein the solution is drawn from the solution dispensing assembly to the collector according to a potential difference.

In an embodiment the method comprises turning the collector with a motor, the collector comprising a drum collector.

In an embodiment the power supply comprises a dual polarity power supply.

It will be appreciated that variations of the above-disclosed and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the following claims.

What is claimed is:

1. An electrospinning system comprising:
   a power supply;
   a spooling assembly configured to spool a substrate;
   a wire held at a voltage above the spooling assembly;
   a bar held at an opposite voltage below the spooling assembly the bar comprising:
     a projection portion;
     a first trough on a first side of the projection portion; and
     a second trough on a second side of the projection portion; and
   a slider for distributing solution on the bar, wherein solution is drawn from the bar to the substrate via a potential difference between the wire and the bar, forming a fiber mat on the substrate.

2. The electrospinning system of claim 1 wherein the spooling assembly comprises:
   a rotating substrate spool;
   at least one spinning spool; and
   nanofiber substrate spool.

3. The electrospinning system of claim 1 wherein the slider comprises:
   a slider frame, wherein the bar is mounted below the slider frame;
   a bottom rail of the slider frame;
   a pulley configured in the bottom rail; and
   a motor operably connected to the pulley configured to change a position of the slider frame.

4. The electrospinning system of claim 1 further comprising:
   a solution tank configured to supply solution to a syringe fitted with a needle.

5. The electrospinning system of claim 4 wherein the solution comprises a polymer solution.

6. The electrospinning system of claim 1 wherein the substrate comprises a non-woven melt-blown polypropylene.

7. The electrospinning system of claim 1 further comprising:
   at least one reflector plate, positioned below the bar.

8. The electrospinning system of claim 7 wherein the at least one reflector plate is held at a voltage matching that of the bar.

9. The electrospinning system of claim 1 wherein the power supply comprises a dual polarity power supply.

10. An apparatus comprising:
    a dual polarity power supply;
    a spooling assembly configured to spool a substrate;
    a wire held at a voltage above the spooling assembly;
    a bar held at an opposite voltage below the spooling assembly the bar comprising:
      a projection portion;
      a first trough on a first side of the projection portion; and
      a second trough on a second side of the projection portion; and
    a syringe attached to a needle for distributing solution on the bar, wherein solution is drawn from the bar to the substrate via a potential difference between the wire and the bar, forming a fiber mat on the substrate.

11. The apparatus of claim 10 wherein the apparatus comprises:
    a solution tank;
    a pump; and
    tubing connecting the pump to the syringe.

12. The apparatus of claim 10 wherein the spooling assembly comprises:
    a rotating substrate spool;
    at least one spinning spool; and
    nanofiber substrate spool.

13. The apparatus of claim 10 further comprising a slider, wherein the slider comprises:
    a slider frame, wherein the bar is mounted below the slider frame;
    a bottom rail of the slider frame;
    a pulley configured in the bottom rail; and
    a motor operably connected to the pulley configured to change a position of the slider frame.

14. The apparatus of claim 13 further comprising:
    a pair of risers connecting the bottom rail to a top dispenser bar mount.

15. The apparatus of claim 10 wherein the substrate comprises a non-woven melt-blown polypropylene.

16. The apparatus of claim 10 further comprising:
    at least one reflector plate, positioned below the bar.

17. The apparatus of claim 16 wherein the at least one reflector plate is held at a voltage matching that of the bar.

18. An electrospinning system comprising:
    a dual voltage power supply;
    a spooling assembly configured to spool a substrate;
    a wire connected to the dual voltage power supply and held at a voltage above the spooling assembly;
    a bar connected to the dual voltage power supply and held at an opposite voltage below the spooling assembly;
    at least one reflector plate, positioned below the bar and held at a voltage matching that of the bar; and
    a slider for distributing solution on the bar, wherein solution is drawn from the bar to the substrate via a potential difference between the wire and the bar, forming a fiber mat on the substrate.

* * * * *